United States Patent
Russell et al.

(10) Patent No.: US 11,460,848 B1
(45) Date of Patent: Oct. 4, 2022

(54) BIASED TRAJECTORY PROGRESS METRIC

(71) Applicant: Waymo LLC, Mountain View, CA (US)

(72) Inventors: Jared Stephen Russell, San Francisco, CA (US); Guillaume Dupre, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 12 days.

(21) Appl. No.: 16/211,821

(22) Filed: Dec. 6, 2018

(51) Int. Cl.
  *G05D 1/02* (2020.01)
  *G05D 1/00* (2006.01)
  *G08G 1/01* (2006.01)

(52) U.S. Cl.
  CPC ......... *G05D 1/0217* (2013.01); *G05D 1/0088* (2013.01); *G08G 1/0125* (2013.01); *G05D 2201/0212* (2013.01); *G05D 2201/0213* (2013.01)

(58) Field of Classification Search
  CPC ............... G05D 1/0217; G05D 1/0088; G05D 2201/0212; G05D 2201/0213; G08G 1/0125
  See application file for complete search history.

(56) References Cited

U.S. PATENT DOCUMENTS

| | | | |
|---|---|---|---|
| 6,792,363 B1 * | 9/2004 | Bye | G05D 1/0005 701/2 |
| 9,261,376 B2 | 2/2016 | Zheng et al. | |
| 9,792,814 B2 | 10/2017 | Glasgow et al. | |
| 9,910,441 B2 | 3/2018 | Levinson et al. | |
| 2009/0088916 A1* | 4/2009 | Elgersma | G05D 1/101 701/23 |
| 2010/0082226 A1* | 4/2010 | Mukherjee | G08G 1/0104 701/118 |
| 2010/0106356 A1* | 4/2010 | Trepagnier | G05D 1/0248 701/25 |
| 2013/0211656 A1* | 8/2013 | An | G01C 21/3407 701/25 |
| 2014/0244125 A1* | 8/2014 | Dorum | G08B 23/00 701/70 |
| 2015/0160024 A1* | 6/2015 | Fowe | G01C 21/3461 701/400 |
| 2017/0010106 A1* | 1/2017 | Shashua | G01C 21/3407 |

(Continued)

FOREIGN PATENT DOCUMENTS

CN 103743407 A * 4/2014

OTHER PUBLICATIONS

CN103743407A Machine Translation, Xie Jianjia (Year: 2014).*

*Primary Examiner* — Hunter B Lonsberry
*Assistant Examiner* — Elizabeth Yang
(74) *Attorney, Agent, or Firm* — Botos Churchill IP Law

(57) ABSTRACT

The technology relates to adjusting a trajectory of an autonomous vehicle. In one example, one or more processors are configured to determine a current trajectory and an alternate trajectory of the autonomous vehicle. The one or more processors select a segment of the current trajectory and a segment of the alternate trajectory and determine, for each of the segments, a total expected value of an estimated length of time to traverse the respective segment. The one or more processors may then select one of the segments having the lowest expected value and maneuver the autonomous vehicle along at least a portion of the selected segment.

30 Claims, 10 Drawing Sheets

(56) References Cited

U.S. PATENT DOCUMENTS

| | | | |
|---|---|---|---|
| 2017/0146355 A1* | 5/2017 | Xu | G01C 21/3446 |
| 2017/0248959 A1* | 8/2017 | Matsubara | G05D 1/0212 |
| 2017/0313332 A1* | 11/2017 | Paget | H04N 7/183 |
| 2018/0022361 A1* | 1/2018 | Rao | B60W 50/0098 |
| | | | 701/23 |
| 2018/0059670 A1* | 3/2018 | Nilsson | B60W 30/09 |
| 2018/0141568 A1* | 5/2018 | Singhal | A61B 5/01 |
| 2019/0056739 A1* | 2/2019 | Sunil Kumar | G06K 9/00791 |
| 2020/0041997 A1* | 2/2020 | Tuukkanen | G05D 1/0088 |
| 2020/0055362 A1* | 2/2020 | Anderson | B60G 17/0195 |
| 2020/0082287 A1* | 3/2020 | Beaurepaire | G06N 5/047 |
| 2020/0130703 A1* | 4/2020 | Pendelton | G06K 9/00302 |
| 2020/0133280 A1* | 4/2020 | Seccamonte | G05D 1/0242 |
| 2020/0275817 A1* | 9/2020 | Nordt | A47L 11/28 |
| 2021/0253128 A1* | 8/2021 | Nister | B60W 60/0027 |

* cited by examiner

BIASED TRAJECTORY PROGRESS METRIC

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Passengers of the autonomous vehicles may have an expectation that the autonomous vehicles will safely and comfortably transport them to their destinations expeditiously. Therefore, being able to determine and take the most expeditious route to the passengers' destinations while assuring the passengers' safety and comfort can be especially important to ensuring a satisfactory autonomous driving experience.

BRIEF SUMMARY

Aspects of the disclosure provide a method for adjusting a trajectory of an autonomous vehicle. The method may comprise determining, by one or more processors, a current trajectory and an alternate trajectory of the autonomous vehicle; selecting, by the one or more processors, a segment of the current trajectory and a segment of the alternate trajectory; determining for each of the segments, by the one or more processors, a total expected value of an estimated length of time to traverse the respective segment; selecting, by the one or more processors, one of the segments having the lowest expected value; and maneuvering, by the one or more processors, the autonomous vehicle along at least a portion of the selected segment.

In some instances, the method may further comprise separating the segment of the current trajectory into two or more portions; separating the segment of the alternate trajectory into two or more portions; determining for each of the two or more portions of the segment of the current trajectory, one or more estimated lengths of time for traversing that respective portion; and determining, for each of the two or more portions of the segment of the current trajectory, an expected value of traversing the respective portion based on the one or more estimated lengths of time for traversing that respective portion.

In some examples, the total expected value of an estimated length of time to traverse the segment of the current trajectory is the total expected value of traversing the two or more portions of the segment of the current trajectory In some examples, the method further comprises determining, for each of the two or more portions of the segment of the alternate trajectory, one or more estimated lengths of time for traversing that respective portion; and determining, for each of the two or more portions of the alternate trajectory, an expected value of traversing the respective portion based on the one or more estimated lengths of time for traversing that respective portion. In some instances, the total expected value of an estimated length of time to traverse the segment of the alternate trajectory is the total expected value of traversing the two or more portions of the segment of the alternate trajectory In some examples, the two or more portions of the segment of the current trajectory and the two or more portions of the segment of the alternate trajectory are an equal distance. In some examples, determining the one or more estimated lengths of time for traversing each of the two or more portions of the segment of the current trajectory and alternate trajectory includes increasing or decreasing the estimated length of time for each portion based on historical behavior of objects or historical data of a projected location of the vehicle. In some examples, the historical behavior of objects includes one or more of typical wait times at a stop light, typical wait times at an intersection, and typical wait times at a rail crossing. In some examples, the historical data of the projected location of the vehicle includes traffic data corresponding to a time of day the autonomous vehicle is projected to traverse the current trajectory or the alternate trajectory.

In some instances, determining the one or more estimated lengths of time for traversing each of the two or more portions of the segment of the current trajectory and alternate trajectory includes increasing or decreasing the estimate length of time based on predicted actions of one or more objects within the respective portion's location.

In some instances, the alternate trajectory is two or more trajectories.

In some instances, the method further comprises, prior to maneuvering the autonomous vehicle along the selected segment, determining the maneuver is with a passenger comfort level.

Aspects of the disclosure provide a system for adjusting a trajectory of an autonomous vehicle. The system includes one or more processors, wherein the one or more processors are configured to: determine a current trajectory and an alternate trajectory of the autonomous vehicle; select a segment of the current trajectory and a segment of the alternate trajectory; determine for each of the segments a total expected value of an estimated length of time to traverse the respective segment; select one of the segments having the lowest expected value; and maneuver the autonomous vehicle along at least a portion of the selected segment.

In some instances, the one or more processors are further configured to: separate the segment of the current trajectory into two or more portions; separate the segment of the alternate trajectory into two or more portions; determine, for each of the two or more portions of the segment of the current trajectory, one or more estimated lengths of time for traversing that respective portion; and determine, for each of the two or more portions of the segment of the current trajectory, an expected value of traversing the respective portion based on the one or more estimated lengths of time for traversing that respective portion. In some examples, the total expected value of an estimated length of time to traverse the segment of the current trajectory is the total expected value of traversing the two or more portions of the segment of the current trajectory.

In some examples, the one or more processors are further configured to: determine, for each of the two or more portions of the segment of the alternate trajectory, one or more estimated lengths of time for traversing that respective portion; and determine, for each of the two or more portions of the segment of the alternate trajectory, an expected value of traversing the respective portion based on the one or more estimated lengths of time for traversing that respective portion. In some instances, the total expected value of an estimated length of time to traverse the segment of the alternate trajectory is the total expected value of traversing the two or more portions of the segment of the alternate trajectory In some instances, the two or more portions of the segment of the current trajectory and the two or more portions of the segment of the alternate trajectory are an equal distance.

In some instances, determining the one or more estimated lengths of time for traversing each of the two or more portions of the segment of the current trajectory and alternate trajectory includes increasing or decreasing the estimated length of time for each portion based on historical behavior of objects or historical data of a projected location of the vehicle.

In some instances, determining the one or more estimated lengths of time for traversing each of the two or more portions of the segment of the current trajectory and alternate trajectory includes increasing or decreasing the estimate length of time based on predicted actions of one or more objects within the respective portion's location.

DETAILED DESCRIPTION

Overview

Figure 1:
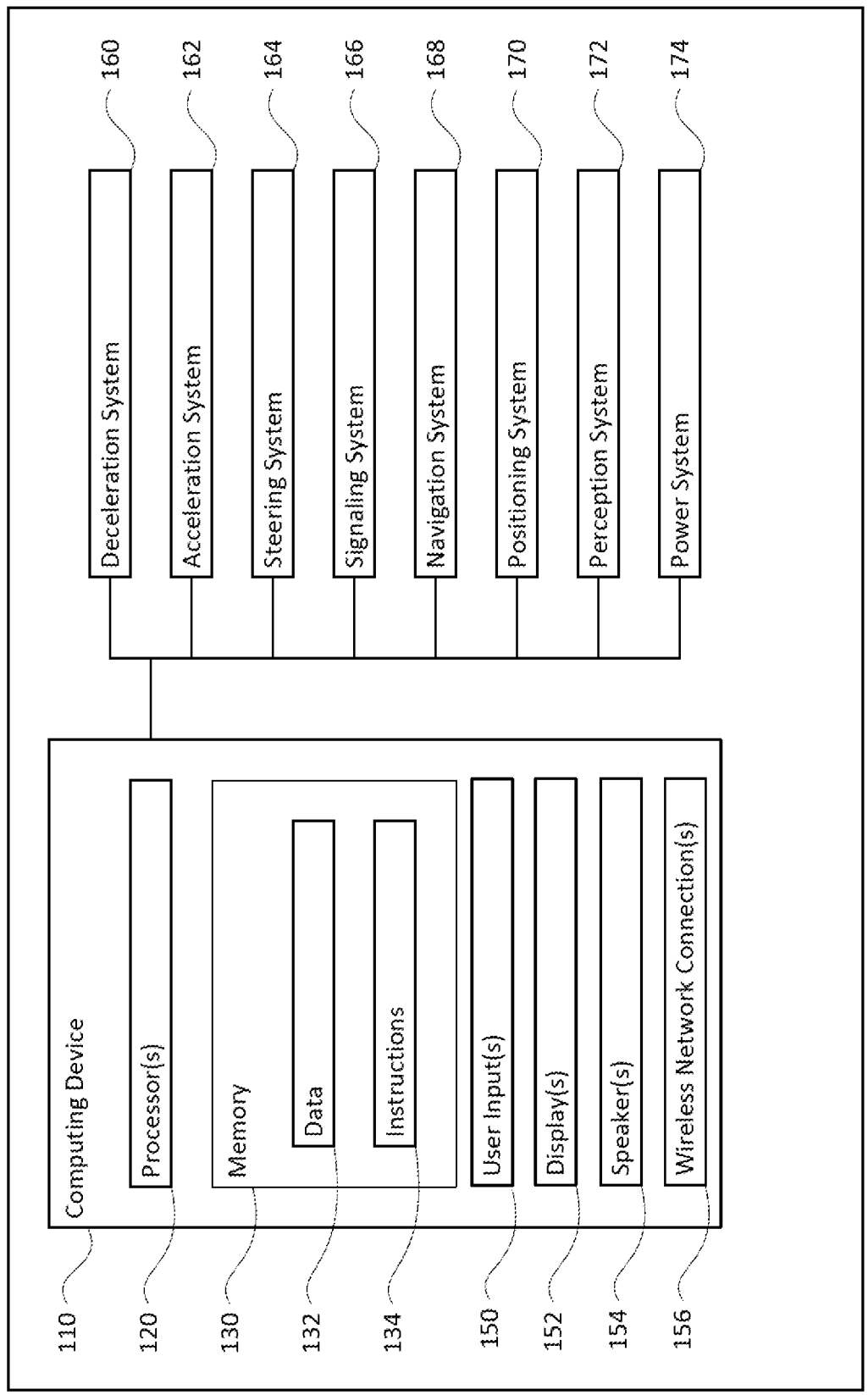
FIG. 1 is a functional diagram of an example vehicle in accordance with aspects of the disclosure.

This technology relates to minimizing delays caused by following trajectories which may be difficult and/or time consuming to traverse. For instance, autonomous vehicles may be operated in situations which may prevent the autonomous vehicle from making progress or reduce the progress of the autonomous vehicle along its current trajectory. For example, the autonomous vehicle's current trajectory may result in the autonomous vehicle encountering situations such as travelling behind a slow moving vehicle (e.g., garbage truck, snow plow, etc.), having to wait to make an unprotected left turn or yield onto a busy road, being unable to change lanes due to heavy traffic in an adjacent lane, being stuck behind a stopped or stalled vehicle, travelling behind a cyclist going slower than the speed limit, etc. In these situations, human drivers may take more assertive actions than normal, such as by maneuvering around a slowly moving or stationary vehicle or cyclist, by crossing into a shoulder or adjacent lane, changing lanes, yielding, turning onto a road with less space than normal between the vehicle in the lane into which the driver is changing, etc. However, since the autonomous vehicle follows a planned trajectory, the autonomous vehicle may make only make small amounts of progress or no progress at all until a human driver takes control or until the situation improves, such as when the traffic levels are reduced, vehicles or cyclists move out of the autonomous vehicle's path, etc.

To address these issues, the autonomous vehicle may follow an alternate trajectory or take a more assertive action to traverse the trajectory when the autonomous vehicle encounters a segment of its current trajectory which may be difficult and/or time consuming to traverse. In this regard, a computing device of the autonomous vehicle may select a segment of an upcoming portion of its current trajectory and monitor for objects which may impact the autonomous vehicle's ability to traverse the segment. Based on these objects and other data corresponding to the autonomous vehicle's operation and location, the computing device may determine an expected value of an estimated length of time the autonomous vehicle would take to traverse the segment. The expected value of estimated lengths of time may be an average of the estimated lengths of times for traversing the segment which may take into account objects in the vehicle's vicinity and, in some instances, historical data corresponding to the location of the segment or objects therein. In addition, the computing device may determine an expected value of an estimated length of time the autonomous vehicle would take to traverse each of one or more alternate trajectories which direct the autonomous vehicle to the same ending point as the current segment, but along a different path. The alternate trajectory or the current trajectory having the lowest expected value of estimated length of travel time to the ending point of the segment may be selected as the new trajectory to take to the ending point.

In some instances, the historical behavior of objects and/or historical data of the location the vehicle is traversing may affect the value indicative of the relative difficulty of traversing a portion of a segment of a trajectory. The historical behavior of objects, historical data corresponding to location, or predicted behavior of objects in the vehicle's vicinity may be used to determine whether more assertive maneuvers should be performed by the autonomous vehicle to reduce the expected value of estimated length of travel time of a segment of a current trajectory.

Passenger comfort may also be used to determine whether a trajectory change or assertive maneuver should be performed by the vehicle. In this regard, assertive maneuvers, like quick lane changes in traffic, may cause a passenger to be uncomfortable with the vehicle's operation. To avoid this, the passenger's comfort may determine whether a passenger's predicted discomfort level from performing an assertive maneuver outweighs the benefits of the assertive maneuver. Based on this determination the computing device may or may not initiate the assertive maneuver.

The features described herein may allow for autonomous vehicles to complete portions of their trips quickly and efficiently. In this regard, the autonomous vehicle may complete portions of their trips Moreover, the features may allow autonomous vehicles to make progress in situations where autonomous vehicles are typically prevented or have difficulty making progress following typical driving maneuvers, such as when travelling behind a slow moving vehicle (e.g., garbage truck, snow plow, etc.), having to wait to make an unprotected left turn or yield onto a busy road, being unable to change lanes due to heavy traffic in an adjacent lane, being stuck behind a stopped or stalled vehicle, travelling behind a cyclist going slower than the speed limit, etc.

The features described herein may also improve routing to avoid roads which are historically difficult to traverse.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The processor 120 may be a conventional processor, such as commercially available CPU. Alternatively, the processor 120 may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory 130 may be a hard drive and/or other storage media located in housing different from that of computing device 110. Accordingly, references to a processor or computing device will be understood to include references to a collection of processors or computing devices or memories that may or may not operate in parallel.

Computing device 110 may include all of the components normally used in connection with a computing device such as the processor and memory described above as well as one or more user inputs 150 (e.g., a mouse, keyboard, touch screen and/or microphone) and various electronic displays (e.g., a monitor having a screen or any other electrical device that is operable to display information). In this example, the vehicle includes one or more internal displays 152 as well as one or more speakers 154 to provide information or audio visual experiences. In this regard, display 152 may be located within a cabin of vehicle 100 and may be used by computing device 110 to provide information to passengers or maintenance personnel within or otherwise in the vicinity of, the vehicle 100.

Computing device 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, Wi-Fi and HTTP, and various combinations of the foregoing. Computing device 110 of vehicle 100 may also receive or transfer information to and from other computing devices (not shown), such as computing devices which contain or otherwise store further map or perception data.

In one example, computing device 110 may control the computing devices of an autonomous driving computing system incorporated into vehicle 100. The autonomous driving computing system may capable of communicating with various components of the vehicle in order to control the movement of vehicle 100 according to primary vehicle control code stored in memory 130. For example, computing device 110 may be in communication with various systems of vehicle 100, such as deceleration system 160, acceleration system 162, steering system 164, signaling system 166, navigation system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100.

As an example, computing device 110 may interact with one or more actuators or other such components of the deceleration system 160, acceleration system 162, and/or power system 174, such as brakes, accelerator pedal, and/or the engine or motor of the vehicle, in order to control the speed of the vehicle. Similarly, one or more actuators or other such components of the steering system 164, such as a steering wheel, steering shaft, and/or pinion and rack in a rack and pinion system, may be used by computing device 110 in order to control the direction of vehicle 100. For example, if vehicle 100 is configured for use on a road, such as a car or truck, the steering system may include one or more actuators or other such devices to control the angle of wheels to turn the vehicle. Signaling system 166 may be used by computing device 110 in order to signal the vehicle's intent to other drivers or vehicles, for example, by lighting turn signals or brake lights when needed.

Figure 3:
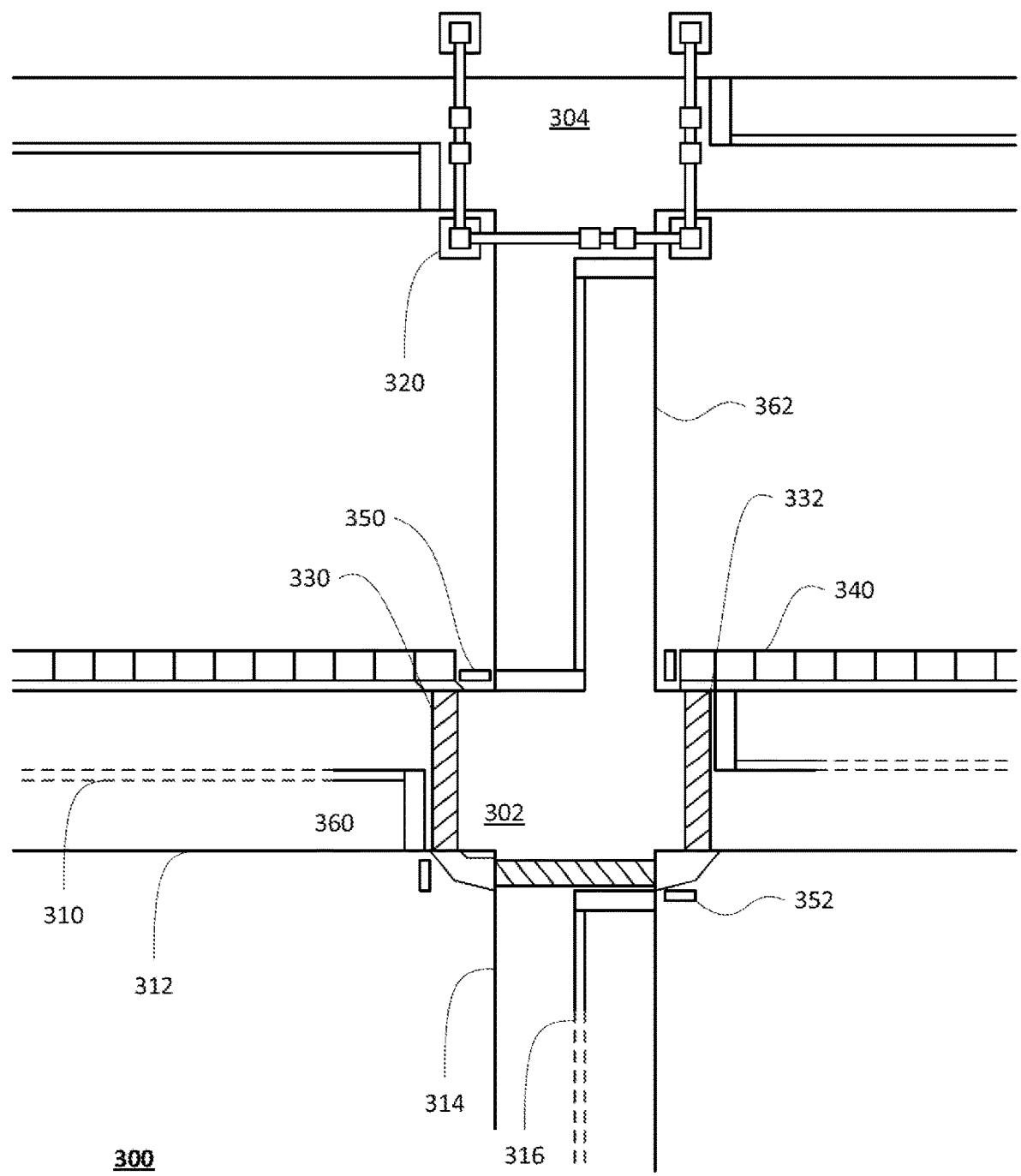
FIG. 3 is an example view of a section of roadway corresponding to map information in accordance with aspects of the disclosure.

Navigation system 168 may be used by computing device 110 in order to determine and follow a route to a location. In this regard, the navigation system 168 and/or data 132 may store detailed map/roadmap information, e.g., highly detailed maps identifying the shape and elevation of roadways, lane lines, intersections, crosswalks, speed limits, traffic signals, buildings, signs, real time traffic information, vegetation, or other such objects and information. For instance, FIG. 3 shows example map information identifying the shape, location, and other characteristics of various roads, such as roads 360 and 362 and road features proximate to intersections 302 and 304. In this example, the map information 300 includes information defining the shape and location of lane markers 310-316, traffic signal lights 320 (e.g., stop lights), crosswalks 330, 332, sidewalk 340, stop signs 350, 352, etc. Although the example of map information 300 includes only a few road features, for instance, lane lines, shoulder areas, an intersection, and lanes and orientations, map information 300 may also identify various other road features such as traffic signal lights, crosswalks, sidewalks, stop signs, yield signs, speed limit signs, road signs, speed bumps, etc. Although not shown, the map information 300 may also include information identifying speed limits and other legal traffic requirements, such as which vehicle has the right of way given the location of stop signs or state of traffic signals, etc.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing device 110 in order to determine the vehicle's relative or absolute position on a map or on the earth. For example, the positioning system 170 may include a GPS receiver to determine the positioning system's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 may also include one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. For example, the perception system 172 may include lasers, sonar, radar, cameras and/or any other detection devices that record data which may be processed by the computing device. In some instances, the perception system may include a laser or other sensors mounted on the roof or other convenient location of a vehicle. For instance, the perception system 172 may use various sensors, such as LIDAR, sonar, radar, cameras, etc. to detect objects and their characteristics such as location, orientation, size, shape, type, direction and speed of movement, etc. In the case where the vehicle is a passenger vehicle such as a minivan, the minivan may include a laser or other sensors mounted on the roof or other convenient location.

Figure 2:
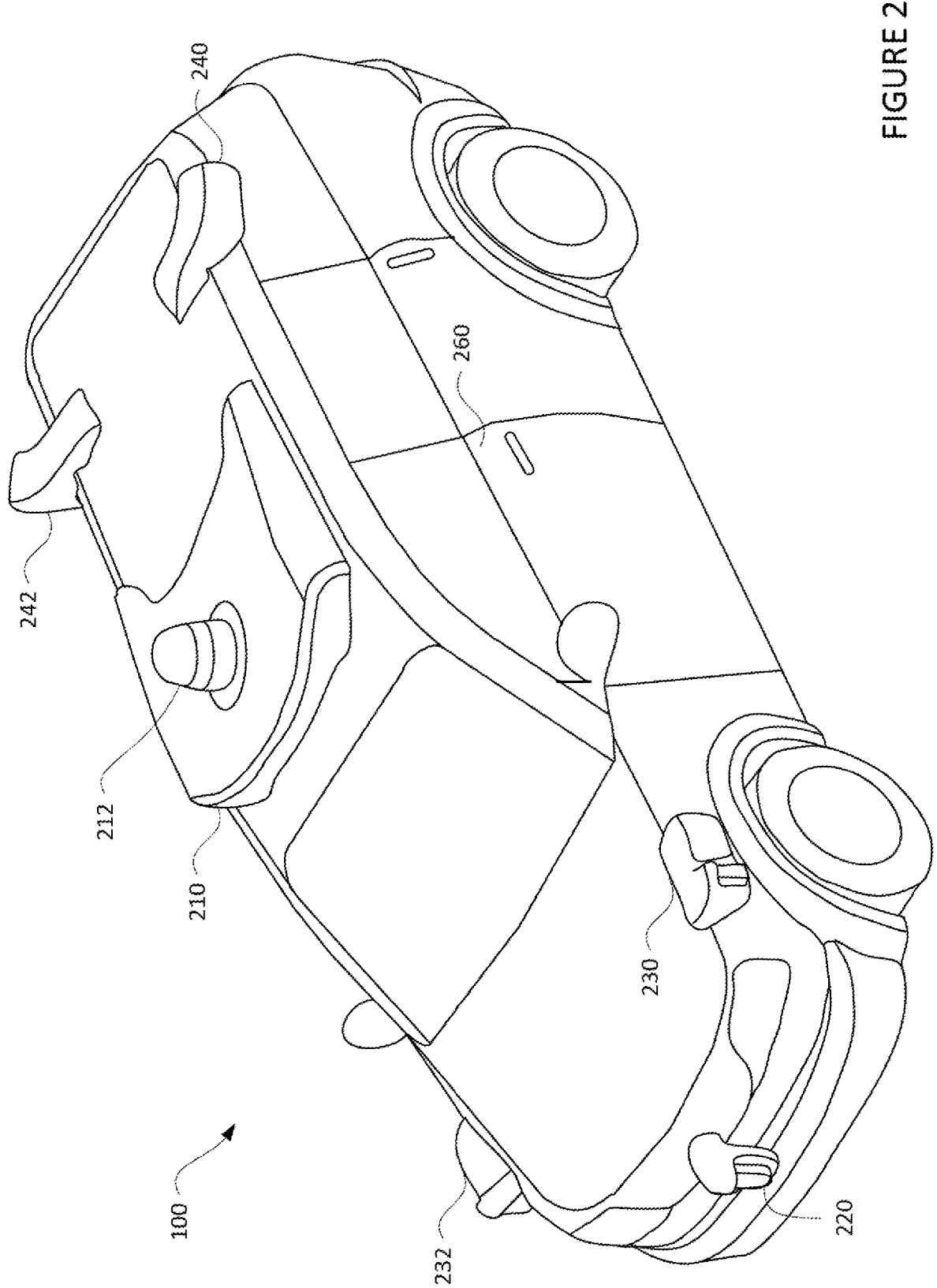
FIG. 2 is an example representative view of a vehicle in accordance with aspects of the disclosure.

For instance, FIG. 2 is an example external view of vehicle 100. In this example, a roof-top sensor housing 210 and a dome sensor housing 212 may include one or more lidar sensors, cameras, and/or radar units. In addition, housing 220 located at the front end of vehicle 100 and housings 230, 232 on the driver's and passenger's sides of the vehicle may each store a lidar sensor. For example, housing 230 is located in front of driver door 260. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top sensor housing 210. In this regard, each of housings 210, 212, 220, 230, 232, 240, and 242 may be considered sensor housings any or all of the aforementioned sensors may be considered a part of the vehicle's perception system 172.

The computing device 110 may use the positioning system 170 to determine the vehicle's location and perception system 172 to detect and respond to objects, such as surrounding vehicles, pedestrians, railroad crossing, etc., when needed to reach the location safely. In order to do so, computing devices 110 may cause the vehicle 100 to accelerate (e.g., by increasing fuel or other energy provided to the engine by acceleration system), decelerate (e.g., by decreasing the fuel supplied to the engine, changing gears, and/or by applying brakes by deceleration system), change direction (e.g., by turning the front or rear wheels of vehicle by steering system), and signal such changes (e.g., by lighting turn signals of signaling system). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Based on data received from the various system components, the computing devices may control the direction, speed, acceleration, etc. of the vehicle by sending instructions to the various components of the vehicle. For instance, the computing devices 110 may navigate the vehicle to a destination location completely autonomously using data from the map information and navigation system 168 and positioning system 170.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
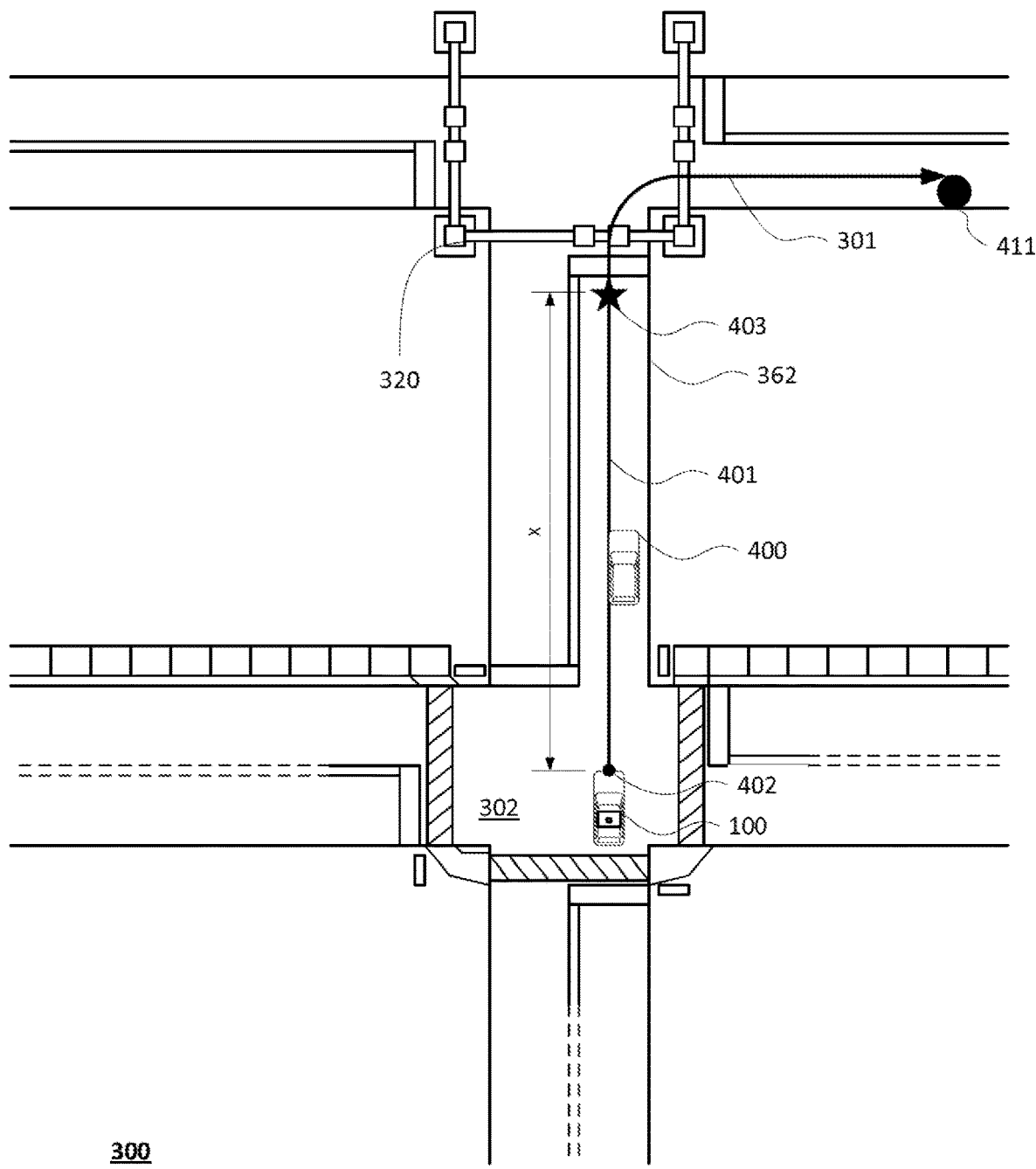
FIG. 4 is an example trajectory and segment of the trajectory overlaid on a section of roadway corresponding to map information in accordance with aspects of the disclosure.

When traveling, an autonomous vehicle, such as autonomous vehicle 100, may monitor upcoming segments of the current trajectory to determine whether a situation may prevent the autonomous vehicle from traversing that segment as expected, or rather, as prescribed by the current trajectory. For example, FIG. 4 shows the location of autonomous vehicle 100 overlaid on map information 300. The computing devices 110 of autonomous vehicle 100 may monitor upcoming segment 401 of the current trajectory 301 to destination 411, as further shown in FIG. 4. The segment may include a starting point 402 and ending point 403.

The monitored segment may be of a certain size or the size may be on the operating location and conditions of the vehicle. In this regard, the length of the segment 401 may be large enough to provide time for the autonomous vehicle 100 to change its course, if necessary, but small enough for the vehicle's sensors to detect objects, such as other vehicle 400, which may potentially effect traversal of the segment by the autonomous vehicle. For example, the size of segment 401 between the starting point 402 and ending point 403 and illustrated by "X", may be fifty meters, or more or less. In some instances, the size of each segment may be based on the speed and location of the vehicle. For example, when the vehicle is traveling on a highway at highway speeds, the segment may be longer than when the vehicle is traveling on a residential road at slower speeds. In another example, the size of the segment may be a predetermined distance, such as 50 meters or more or less.

Figure 5:
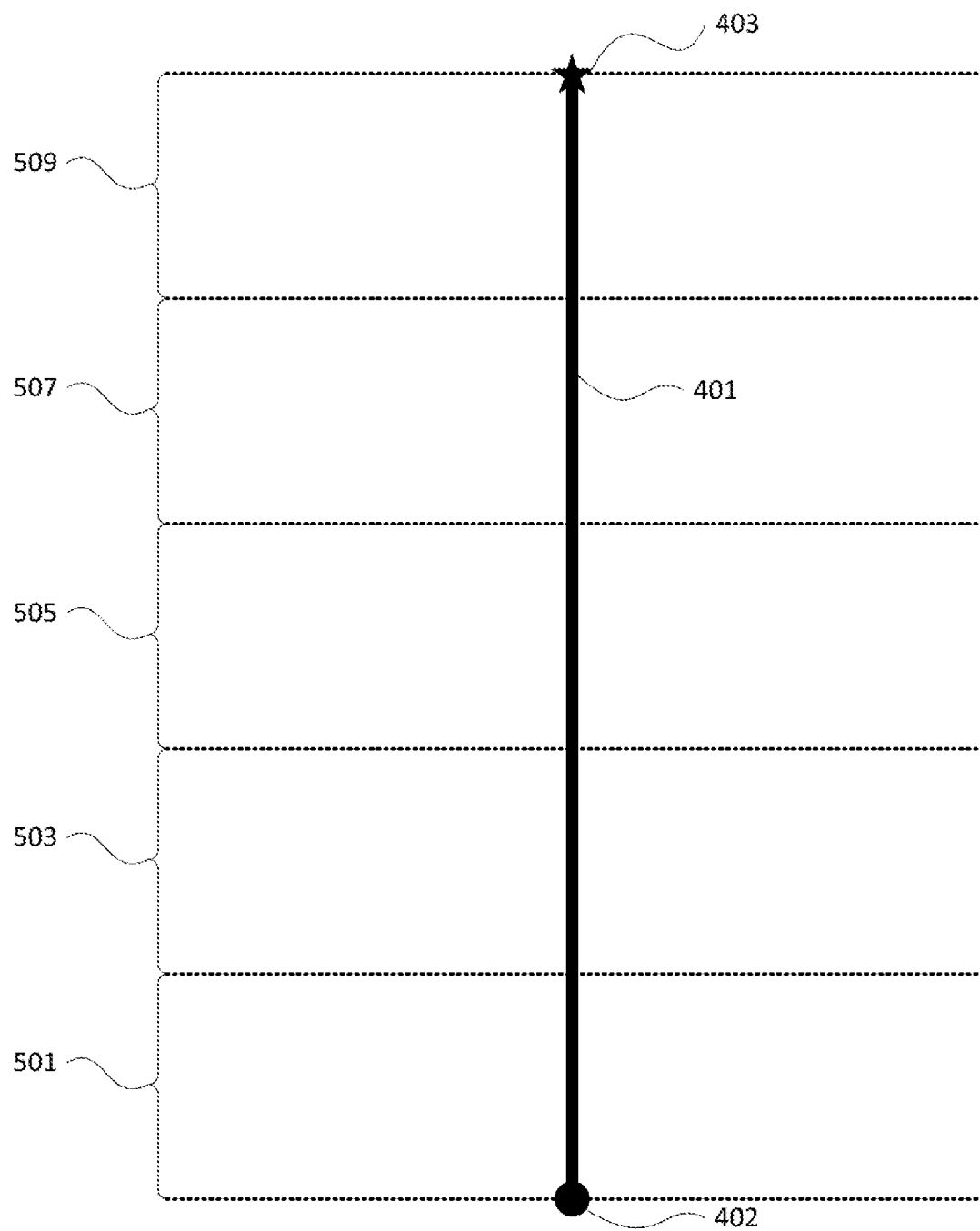
FIG. 5 is an example segment separated into portions in accordance with aspects of the disclosure.

The segment of the trajectory may be broken down into a plurality of portions by the computing devices 110. In this regard, each segment may be broken down into portions having equal or unequal lengths, such as one meter, or more or less. For example, segment 401 comprising the portion of trajectory 301 between starting point 402 and ending point 403 may be broken into five, ten meter portions 501-509, as shown in FIG. 5.

The computing devices 110 may assign each portion a value indicative of the relative difficulty of traversing that portion. In this regard, the value may represent the expected value of estimated lengths of time that the autonomous vehicle will take to traverse each respective portion 501-509. The estimated lengths of time may be determined based on objects detected in the vehicle's vicinity which may affect the autonomous vehicle's actions, such as other vehicle 400 in the autonomous vehicle's trajectory 301, as further shown in FIG. 4.

Other data corresponding to the autonomous vehicle 100's operation and location, such as the vehicle's speed, the speed limit corresponding to the segment of the trajectory 401 as defined in the map information 300, intersection locations, streetlight locations, etc., may also be used to determine estimated lengths of time the vehicle may take to traverse each portion. For example, a segment of trajectory may include a portion including a left turn at a traffic light. The autonomous vehicle 100 may have high likelihood of traversal of the turn without difficulty (e.g., delay) or being affected by other objects, as such, the estimated length of time to traverse the left turn may be low. However, there may be a small probability that traversing the left turn may include waiting at the light or waiting for oncoming traffic, leading to a higher estimated length of time to traverse the left turn. The expected value of estimated lengths of time may be an average of the estimated lengths of times for each portion of a segment. In some instances, the expected value of estimated lengths of time may be a weighted average of estimate lengths of times for each portion of a segment.

Figure 6:
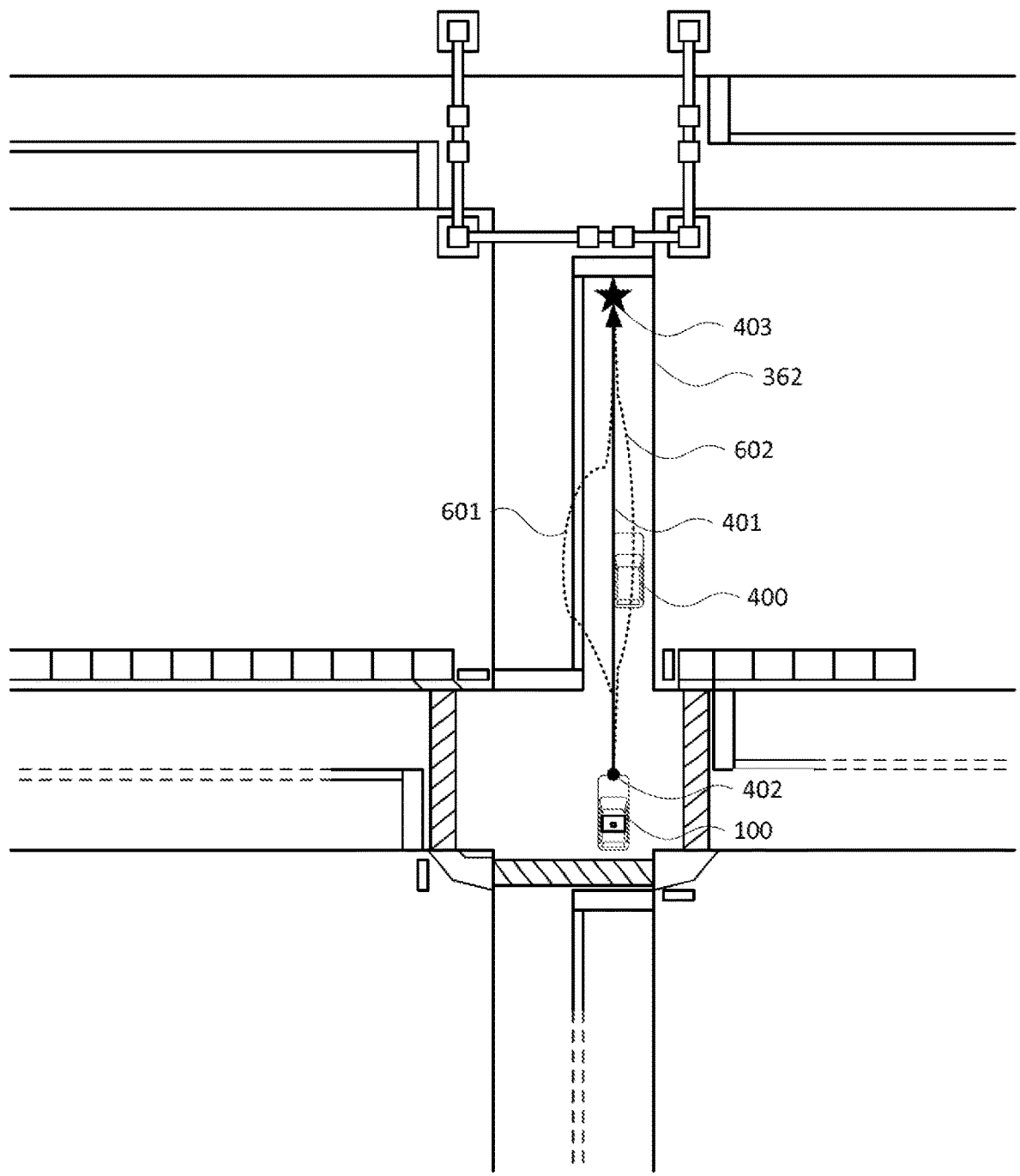
FIG. 6 is an example illustration of segments of alternate trajectories overlaid on a section of roadway corresponding to map information in accordance with aspects of the disclosure.

The computing devices 110 may also determine whether alternate trajectories may result in a quicker, more efficient route to the vehicle's destination. For example, the autonomous vehicle 100's current trajectory 301 may lead to the autonomous vehicle being positioned behind other vehicle 400. To avoid vehicle 400, the computing devices 110 may generate one or more alternate trajectories comprised of a segment, such as segments 601 and 602 which have the same starting point 402 and ending point 403 as segment 401, but provide an alternative path, as shown in FIG. 6. The alternate trajectories that include segments 601 and 602, respectively, may be generated such that they travel along a different route than the current trajectory while taking into account map information and details from the perception system to determine trajectories which are safe and efficient. In some instances, the segments of the alternate trajectories may have different starting and/or ending points of the segment of the current trajectory.

Figure 7A:
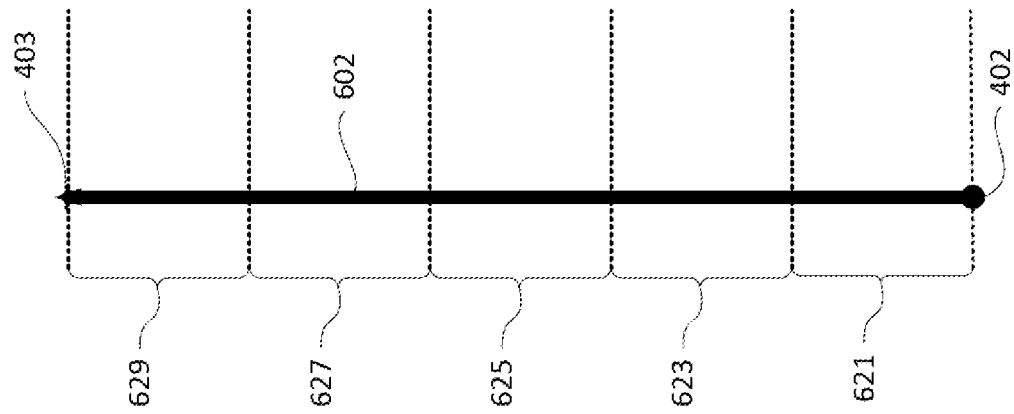
FIGS. 7A and 7B are examples of segments of alternate trajectories separated into portions in accordance with aspects of the disclosure.
Figure 7B:
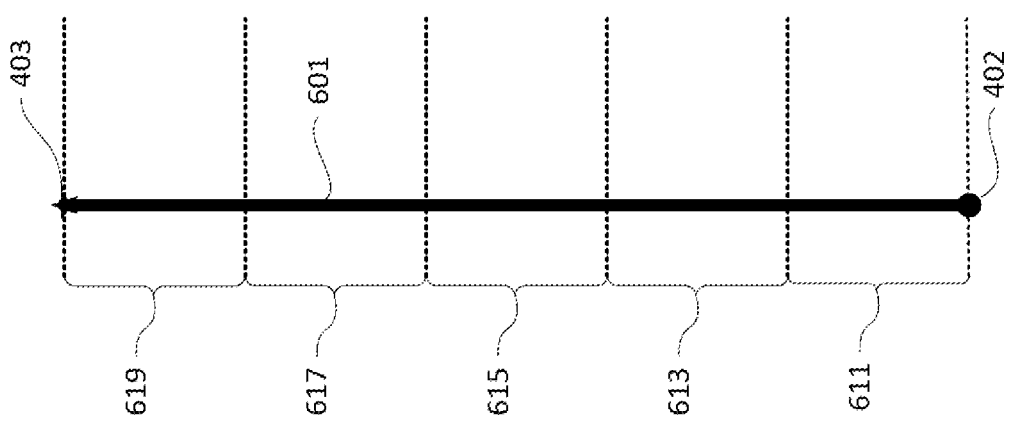

The computing devices 110 may break down each alternate trajectory segment into portions. For instance, segment 601 may be split into portions 611-619, as shown in FIG. 7A. Segment 602 may be split into portions 621-629 as shown in FIG. 7B. The portions may each be the same or different lengths, such as 1 meter, or more or less. Each portion 611-629 may be assigned a value indicative of the relative difficulty of traversal of that portion. For instance, each portion may be assigned a value representing the expected value of estimated length of time the autonomous vehicle will take to traverse that respective portion, as described herein.

For each segment, including the segment of the current trajectory (i.e., segment 401) and the segments of the alternate trajectories (i.e., segments 601 and 602), the computing devices 110 may determine the total expected value of estimated lengths of time to traverse each respective segment. In this regard, the computing device may total the total expected value of the estimated lengths of time to traverse segment of the current trajectory by adding together the expected values of estimated lengths of time assigned to each portion of the current trajectory, or otherwise totaling any other such values. The total expected value of estimated lengths of time to traverse the portions of the segments of the alternate trajectories may also be determined.

The computing devices 110 may cause the autonomous vehicle 100 to traverse the segment of the trajectory having the lowest expected value, which would indicate the least time consuming, and likely, least difficult trajectory to traverse. In this regard, passengers of autonomous vehicles generally prefer taken a route which requires the shortest amount of time. For instance, and referring again to FIG. 6, the computing devices 110 may determine that segment 601 has the lowest expected value of estimated length of time of traversal, such as two minutes. In comparison, segment 401 of the current trajectory may have an expected value of estimated length of time of traversal of five minutes and segment 602 may be six minutes. Accordingly, the computing device 110 may cause the autonomous vehicle 100 to travel segment 601 having a two minute expected travel time.

In some instances, the segment having the lowest expected value of estimated length of time may not provide the quickest route to the autonomous vehicle's destination. This may be the case, for instance, when reaching the destination using the segment having the lowest expected value of estimated length of time would take longer than if a segment having a higher expected value of estimated length of time (i.e., higher than the lowest expected value of estimated length of time) were selected. As such, and for each current and alternate trajectory, the computing devices 110 may determine an estimated time to traverse the remaining portions of a route upon traversing the respective segments of the trajectories. The estimated times may be based upon historical and mapping data, such as traffic conditions, lights, stop signs, etc. A total estimated time for traversing the remaining route and corresponding segment may then be selected. The segment corresponding to the shortest estimate time for traversing the route may be selected as the trajectory of the vehicle.

Figure 8:
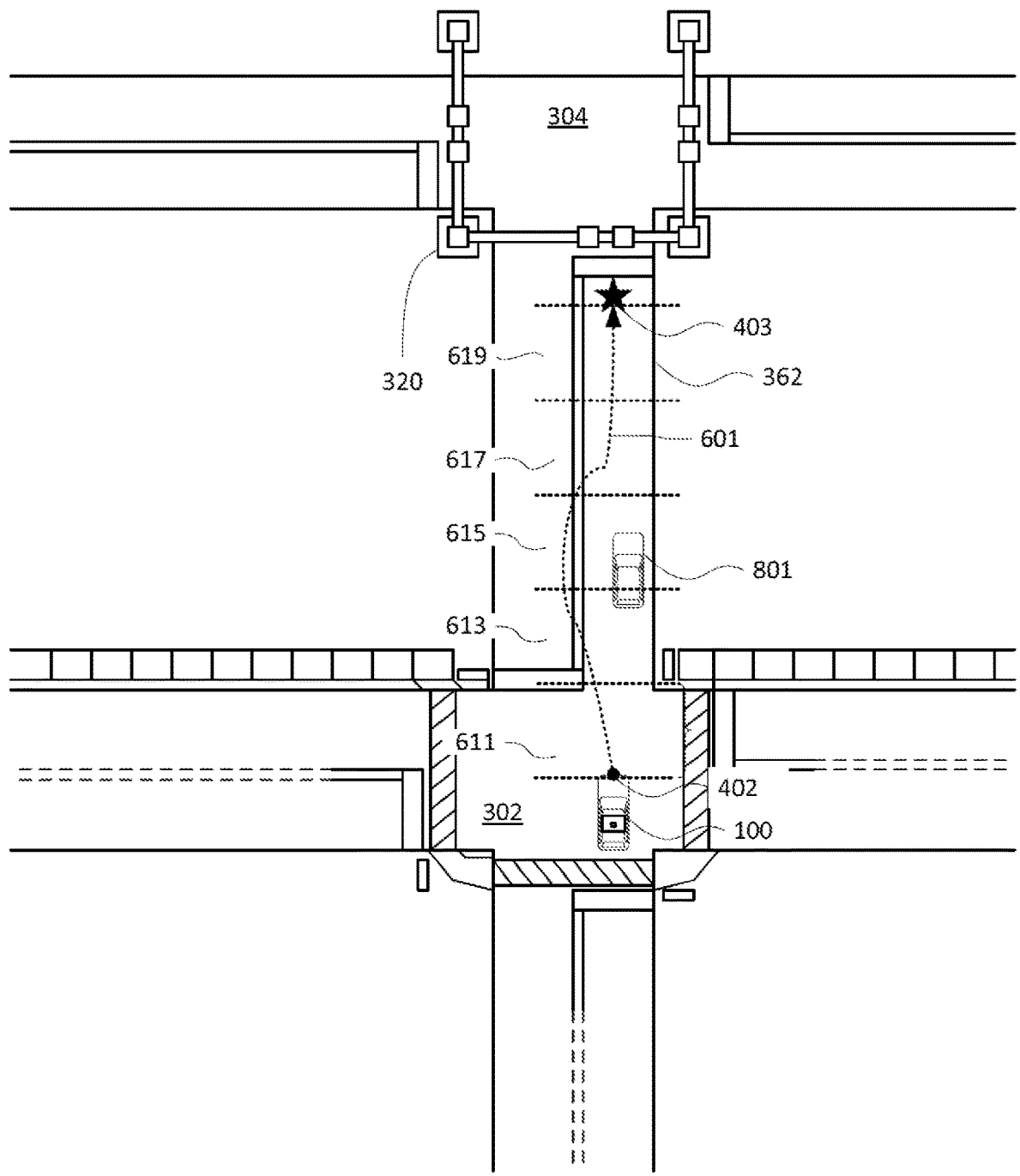
FIG. 8 is an example of a vehicle interfering with a trajectory in accordance with aspects of the disclosure.

The computing devices 110 may also take into account predicted behaviors of objects in the vicinity of the vehicle in determining a value indicative of the relative difficulty of traversing a segment of the autonomous vehicle's current or alternate trajectories. In this regard, the computing devices 110 may utilize predictive models based on predicted behavior of objects in the autonomous vehicle's vicinity. For instance, the computing devices 110 may determine there is a probability that another vehicle, such as vehicle 801 may interfere with the autonomous vehicle 100's ability to traverse portions 613 and 615 of an alternate trajectory's segment 601, such as by making it more difficult for the autonomous vehicle 100 to traverse portions 613 and 615, as shown in FIG. 8. As a result, the expected value of estimated lengths of times for portions 613 and 615 of the alternate trajectory may be adjusted such that the relative difficulty of traversing these portions is increased. The predicted behavior of the objects may be based on machine learning models, such as models which predict pedestrian behaviors and vehicle behaviors.

Historical behavior of objects, data corresponding to the autonomous vehicle's operation, and/or historical data of the vehicle's projected location (i.e., locations within the vehicle's current or alternate trajectories,) may also affect the value indicative of the relative difficulty of traversing one or more portions of a segment of a trajectory. In this regard, the ability to predict the behavior of certain object based on historical actions of the same or similar objects may be used to adjust the value indicative of the relative difficulty of traversing one or more portions of a segment. For instance and again referring to FIG. 8, the historical behavior of the traffic signal light 320 at intersection 304, such as how long the light stays red and/or green, may be used to determine how long traffic may be blocked or allowed through an intersection, respectively. The value indicative of the relative difficulty of traversal of one or more portions of a segment which include the traffic signal light may be adjusted such that the relative difficulty of traversing these portions is increased or decreased based on the information of how long the light stays red and/or green. In some instances, data corresponding to the autonomous vehicle 100's operation and location, such as traffic conditions at particular times of day at the autonomous vehicle's location, typical wait times at a traffic signal light due to light length, typical wait times at an intersection, etc., may be used to adjust the value indicative of the relative difficulty of traversing a portion of a segment of a trajectory. For instance, historical traffic data may include an indication that a portion of a segment may have heavy merging traffic at the time of day the autonomous vehicle may travel the portion. Based on the historical traffic data, the value indicative of the relative difficulty of traversing that portion of the segment may be increased or decreased.

The computing devices 110 may use historical behavior of objects, data corresponding to the autonomous vehicle's operation, historical data of locations within the autonomous vehicle 100's trajectories, and/or predicted behavior of objects in the vehicle's vicinity to determine whether more assertive maneuvers should be performed by the autonomous vehicle to reduce the expected value of estimated length of travel time of a segment of a current trajectory. For instance, and as shown in FIG. 8, the computing devices 110 may determine that a segment of the trajectory may be more quickly traversed if the autonomous vehicle 100 traverses the segment before the traffic signal light (e.g., stop light,) changes. However, when traveling at its typical velocity, the autonomous vehicle 100 may not complete the segment before the traffic signal light switches. As such, the computing device 110 may instruct the autonomous vehicle 100 to take an assertive maneuver such as traveling more quickly to traverse the segment before the stop light switches.

Figure 9:
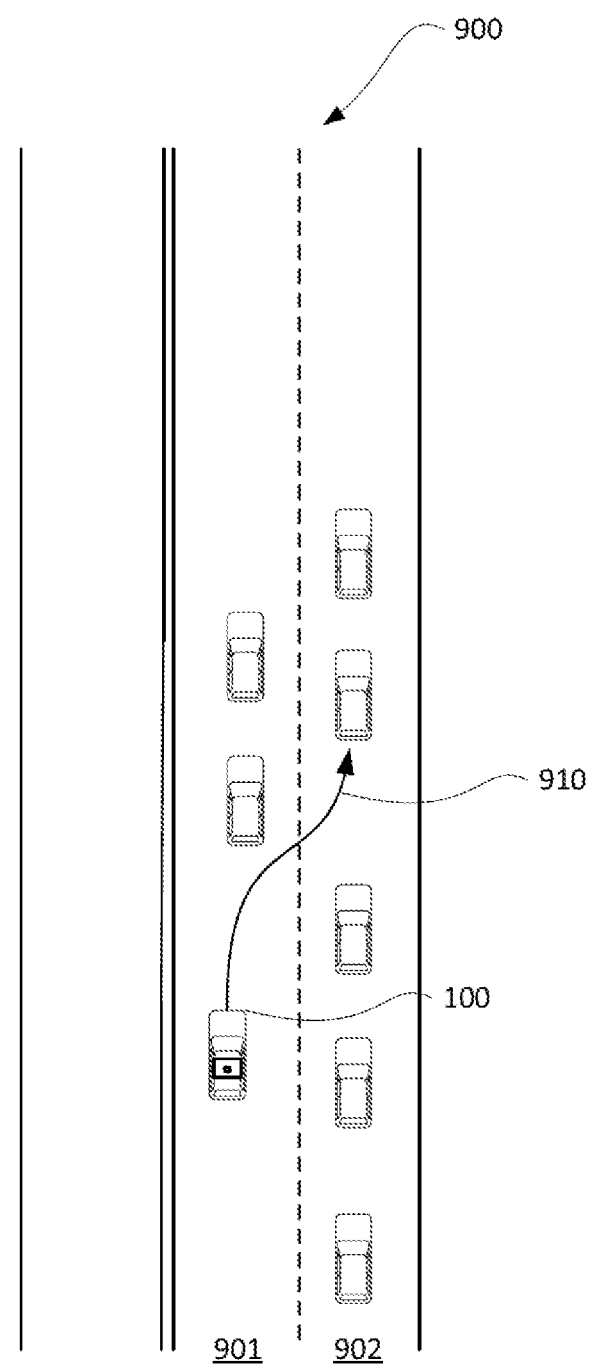
FIG. 9 is an example of a vehicle travelling on a two-lane roadway in heavy traffic with a trajectory into an adjacent lane in accordance with aspects of the disclosure.

In another example, the computing devices 110 may determine when to make assertive maneuvers in order to make progress along a current or alternate trajectory. In this regard, the computing devices 110 may receive data corresponding to the autonomous vehicle's location including historical traffic conditions at the autonomous vehicle's current location. Based on the received historical data, the computing devices 110 may determine that an assertive maneuver may lead to the autonomous vehicle 100 more quickly traversing the current trajectory. For example, the autonomous vehicle 100 may be travelling in heavy traffic in the left lane 901 of a two lane highway 900, as shown in FIG. 9. The current trajectory 910 of the vehicle may be such that that the autonomous vehicle will change lanes by moving from left lane 901 into the right lane 902. Based on the historical data, the computing devices 110 may determine that typical lane change maneuvers by the autonomous vehicle may not allow the autonomous vehicle to change lanes as requested by the current trajectory. As such, the computing devices 110 may instruct the autonomous vehicle 100 to change lanes more assertively, such that the autonomous vehicle slowly makes its way into an adjacent lane. Similar assertive maneuvers may be made at intersections with heavy traffic, such intersections with vehicles stopped therein. In this regard, the autonomous vehicle is able to respond in heavy, slow moving traffic in a productive way.

The computing devices 110 may also take into account the comfort of a passenger prior to initiating a trajectory change or instructing the autonomous vehicle to make an assertive maneuver. In this regard, the computing devices 110 may perform a calculation which weights the benefits of more quickly traversing a segment of a trajectory against the effects felt by a passenger if the autonomous vehicle was to alter its trajectory or taken an assertive maneuver. Such effects felt by a passenger may be determined through quantitative values measured or observed from sensor data, for instance via camera or video images, received by the computing devices 110. For instance, an assertive maneuver, such as a lane change in heavy traffic may result in the autonomous vehicle being positioned close to other vehicles in the adjacent lane, thereby leading to an uncomfortable situation for the passenger. As such, the computing devices 110 may determine that the passenger's discomfort level outweighs the benefits of the assertive maneuver, and the computing devices may not initiate the assertive maneuver.

In some instances, the computing devices may receive a passenger's preferences regarding comfort. For instance, as shown in FIG. 1, a passenger may provide comfort preferences, via the one or more internal displays 152 or the one or more user inputs 150 of the computing device 110 of the autonomous vehicle 100. For passengers with a higher tolerance of discomfort, the autonomous vehicle 100 may make more assertive maneuvers than when traveling with a passenger having a lower tolerance of discomfort.

Figure 10:
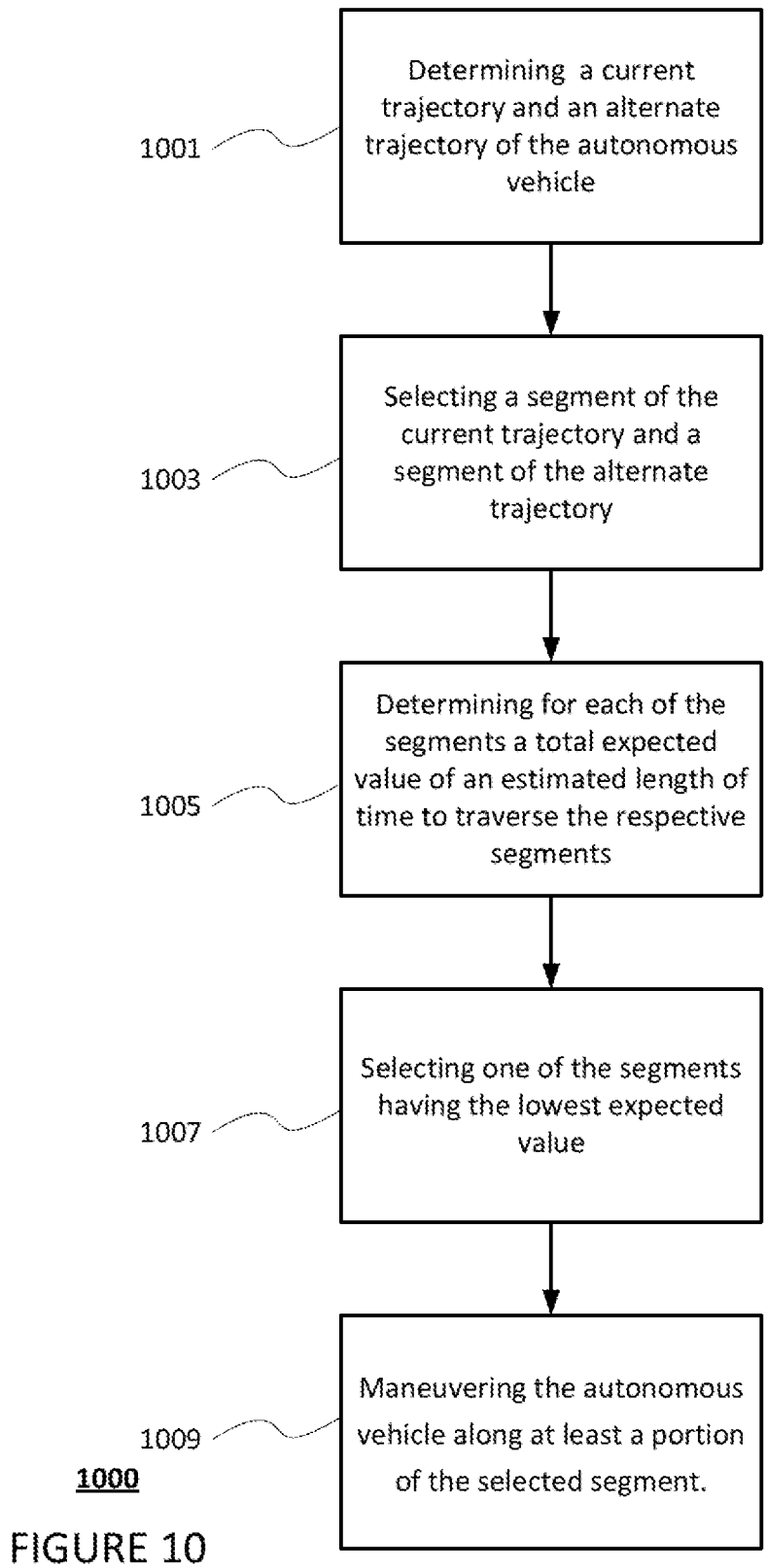
FIG. 10 is an example flow diagram in accordance with aspects of the disclosure.

FIG. 10 is an example flow diagram 1000 that may be performed by one or more processors such as processor 120 of computing devices 110 in order to determine a trajectory for a vehicle, such as vehicle 100, to a destination. At block 1001, a current trajectory and an alternate trajectory of the autonomous vehicle is determined by one or more processes. At block 1003 a segment of the current trajectory and a segment of the alternate trajectory are selected. For each segment a total expected value of an estimated length of time to traverse the respective segments are determined, as shown in block 1005. One of the segments having the lowest expected value is selected and the autonomous vehicle is maneuvered along the selected segment, as shown in blocks 1007 and 1009.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of instructing an autonomous vehicle to perform one or more assertive maneuvers in order to make progress along a current trajectory, the method comprising:
   determining, by one or more processors, the current trajectory of the autonomous vehicle;
   determining, by the one or more processors, an alternate trajectory of the autonomous vehicle;
   selecting, by the one or more processors, a plurality of segments including a selected segment of the current trajectory and a selected segment of the alternate trajectory;
   determining for the selected segment of the current trajectory, by the one or more processors, a relative difficulty of traversing the selected segment of the current trajectory, the relative difficulty comprising an estimated length of time to traverse the selected segment of the current trajectory;
   determining, by the one or more processors, one or more assertive maneuvers that the autonomous vehicle can perform to reduce the estimated length of time to traverse the selected segment of the current trajectory, wherein the one or more assertive maneuvers include at least one of the autonomous vehicle changing lanes or the autonomous vehicle changing speed;
   receiving, by the one or more processors, user input from a passenger of the autonomous vehicle, wherein the user input indicates the passenger's tolerance to discomfort caused by the autonomous vehicle performing the one or more assertive maneuvers;
   determining, by the one or more processors based on the user input, whether the one or more assertive maneuvers should be performed to reduce the estimated length of time to traverse the selected segment of the current trajectory; and
   maneuvering, by the one or more processors, the autonomous vehicle to perform the one or more assertive maneuvers in order to make progress along the current trajectory when the one or more processors determine, based on the user input, that the one or more assertive maneuvers should be performed.

2. The method of claim 1, wherein the estimated length of time to traverse the selected segment of the current trajectory is a length of time to traverse a plurality of segment portions of the selected segment of the current trajectory.

3. The method of claim 1, wherein each respective segment of the plurality of segments includes a plurality of segment portions, the method further comprising:
   determining for each respective segment portion of the plurality of segment portions, by the one or more processors, an expected value of traversing the respective segment portion.

4. The method of claim 3, further comprising:
   determining, for each respective segment portion of the respective segment portions of the selected segment of the alternate trajectory, one or more estimated lengths of time for traversing that respective segment portion; and
   determining, for each of the respective segment portions of the selected segment of the alternate trajectory, an expected value of traversing the respective segment portion based on the one or more estimated lengths of time for traversing that respective segment portion.

5. The method of claim 4, wherein an estimated length of time to traverse the selected segment of the alternate trajectory is the length of time to traverse the respective segment portions of the selected segment of the alternate trajectory.

6. The method of claim 4, wherein the respective segment portions of the selected segment of the current trajectory and the respective segment portions of the selected segment of the alternate trajectory are an equal distance.

7. The method of claim 4, wherein determining the one or more estimated lengths of time for traversing each of the respective segment portions of the selected segment of the current trajectory and the alternate trajectory includes increasing or decreasing the estimated length of time for each portion based on historical behavior of objects or historical data of a projected location of the autonomous vehicle.

8. The method of claim 7, wherein the historical behavior of objects includes one or more of typical wait times at a stop light, typical wait times at an intersection, and typical wait times at a rail crossing.

9. The method of claim 7, wherein the historical data of the projected location of the autonomous vehicle includes traffic data corresponding to a time of day the autonomous vehicle is projected to traverse the current trajectory or the alternate trajectory.

10. The method of claim 4, wherein determining the one or more estimated lengths of time for traversing each of the respective segment portions of the selected segment of the current trajectory and the alternate trajectory includes increasing or decreasing the one or more estimated lengths of time based on predicted actions of one or more objects within the respective segment portion's location.

11. The method of claim 4, wherein the alternate trajectory is two or more trajectories.

12. The method of claim 4, further comprising, prior to maneuvering the autonomous vehicle along the segment determined to have the lowest expected value of the estimated length of time, determining the maneuver is with a passenger comfort level.

13. The method of claim 4, wherein the selected segment of the current trajectory and the selected segment of the alternate trajectory have a common starting point and a common ending point.

14. The method of claim 4, wherein each of the segment portions has a length of approximately 1 meter.

15. The method of claim 3, further comprising:
   determining, by the one or more processors, which segment of the plurality of segments has a lowest expected value of the estimated length of time; and
   maneuvering, by the one or more processors, the autonomous vehicle along at least a portion of the segment determined to have the lowest expected value of the estimated length of time.

16. The method of claim 1, wherein the current trajectory includes a plurality of segments, and the method further includes determining a size of each segment of the plurality based on speed and location of the autonomous vehicle.

17. The method of claim 16, wherein a size of a first segment of the plurality of segments is longer than a second segment of the plurality of segments, and wherein the first segment is a segment of a highway and the second segment is a segment of a residential road.

18. A system for instructing an autonomous vehicle to perform assertive maneuvers in order to make progress along a current trajectory, the system comprising:
   one or more processors, wherein the one or more processors are configured to:
      determine the current trajectory of the autonomous vehicle;
      determine an alternate trajectory of the autonomous vehicle;
      select a plurality of segments including a selected segment of the current trajectory and a selected segment of the alternate trajectory;
      determine for the selected segment of the current trajectory a relative difficulty of traversing the selected segment of the current trajectory, the relative difficulty comprising an estimated length of time to traverse the selected segment of the current trajectory;
      determine one or more assertive maneuvers that the autonomous vehicle can perform to reduce the estimated length of time to traverse the selected segment of the current trajectory, wherein the one or more assertive maneuvers include at least one of the autonomous vehicle changing lanes or the autonomous vehicle changing speed;
      receive user input from a passenger of the autonomous vehicle, wherein the user input indicates the passenger's tolerance to discomfort caused by the autonomous vehicle performing the one or more assertive maneuvers;
      determine, based on the user input, whether the one or more assertive maneuvers should be performed to reduce the estimated length of time to traverse the selected segment of the current trajectory; and
      maneuver the autonomous vehicle to perform the one or more assertive maneuvers in order to make progress along the current trajectory when the one or more processors determine, based on the user input, that the one or more assertive maneuvers should be performed.

19. The system of claim 18, wherein the estimated length of time to traverse the selected segment of the current trajectory is the length of time to traverse a plurality of segment portions of the selected segment of the current trajectory.

20. The system of claim 18, wherein each respective segment of the plurality of segments includes a plurality of segment portions, and the one or more processors are further configured to:
   determine for each respective segment portion of the plurality of segment portions an expected value of traversing the respective segment portion.

21. The system of claim 20, wherein the one or more processors are further configured to:
   determine, for each of respective segment portion of the respective segment portions of the selected segment of the alternate trajectory, one or more estimated lengths of time for traversing that respective segment portion; and
   determine, for each respective segment portion of the respective segment portions of the selected segment of the alternate trajectory, an expected value of traversing the respective segment portion based on the one or more estimated lengths of time for traversing that respective segment portion.

22. The system of claim 21, wherein the estimated length of time to traverse the selected segment of the alternate trajectory is the length of time to traverse the respective segment portions of the selected segment of the alternate trajectory.

23. The system of claim 21, wherein the respective segment portions of the selected segment of the current trajectory and the respective segment portions of the selected segment of the alternate trajectory are an equal distance.

24. The system of claim 21, wherein determining the one or more estimated lengths of time for traversing each of the respective segment portions of the selected segment of the current trajectory and the alternate trajectory includes increasing or decreasing the estimated length of time for each portion based on historical behavior of objects or historical data of a projected location of the autonomous vehicle.

25. The system of claim 21, wherein determining the one or more estimated lengths of time for traversing each respective segment portion of the respective segment portions of the selected segment of the current trajectory and the alternate trajectory includes increasing or decreasing the estimate length of time based on predicted actions of one or more objects within the respective segment portion's location.

26. The system of claim 21, wherein the selected segment of the current trajectory and the selected segment of the alternate trajectory have a common starting point and a common ending point.

27. The system of claim 21, wherein each of the segment portions has a length of approximately 1 meter.

28. The system of claim 20, wherein the one or more processors are further configured to:
   determine which segment of the plurality of segments has a lowest expected value of the estimated length of time; and
   maneuver the autonomous vehicle along at least a portion of the segment determined to have the lowest expected value of the estimated length of time.

29. The system of claim 18, wherein the current trajectory includes a plurality of segments, and the one or more processors are further configured to determine a size of each segment of the plurality based on speed and location of the autonomous vehicle.

30. The system of claim 29, wherein a size of a first segment of the plurality of segments is longer than a second segment of the plurality of segments, and wherein the first segment is a segment of a highway and the second segment is a segment of a residential road.

* * * * *